(12) United States Patent
Johnson

(10) Patent No.: US 7,268,295 B1
(45) Date of Patent: Sep. 11, 2007

(54) PULLER/CONNECTOR FOR ELECTRICAL RACEWAYS

(76) Inventor: Richard A. Johnson, 3188 Pluto Cir., North Fort Myers, FL (US) 33903

( * ) Notice: Subject to any disclaimer, the term of this patent is extended or adjusted under 35 U.S.C. 154(b) by 0 days.

(21) Appl. No.: 11/415,810

(22) Filed: May 2, 2006

(51) Int. Cl.
*H02G 3/04* (2006.01)
*H02G 1/08* (2006.01)

(52) U.S. Cl. .............. 174/68.1; 174/68.3; 174/135; 254/134.3 R; 254/134.3 FT

(58) Field of Classification Search ........... 174/480, 174/8, 68.1, 68.3, 135, 72 R, 72 A, 74 R, 174/75 R, 84 R, 88 R, 70 C, 481; 254/134.3 R, 254/134.3 FT, 134.3 CL; 52/220.1, 220.4, 52/220.7, 220.8; D8/14; 403/301, 296, 403/293
See application file for complete search history.

(56) References Cited

U.S. PATENT DOCUMENTS

| | | | |
|---|---|---|---|
| 916,436 A | 3/1909 | Greenfield | |
| 1,847,924 A | 3/1932 | Calderwood | |
| 2,939,739 A * | 6/1960 | Grunsky | 254/134.3 R |
| 3,058,083 A | 10/1962 | Schneider | |
| 3,330,533 A * | 7/1967 | Blume | 254/134.3 FT |
| 3,567,268 A * | 3/1971 | Peterson | 254/134.3 R |
| 4,078,767 A * | 3/1978 | Battaglia | 254/134.3 FT |
| 4,684,211 A * | 8/1987 | Weber et al. | 254/134.3 R |
| 4,806,108 A | 2/1989 | Meinhardt | |
| 4,978,312 A | 12/1990 | Fodali | |
| 5,052,660 A * | 10/1991 | Bergman | 254/134.3 FT |
| 5,067,843 A * | 11/1991 | Nova | 403/301 |
| D386,052 S * | 11/1997 | Nasir | D8/14 |
| 5,687,954 A * | 11/1997 | Schroeder | 254/134.3 FT |
| D390,763 S * | 2/1998 | Nasir | D8/14 |
| 5,769,665 A | 6/1998 | Neely et al. | |
| 6,863,576 B2 | 3/2005 | Campbell et al. | |
| 6,991,220 B2 * | 1/2006 | Rivers et al. | 254/134.3 FT |
| 2005/0250354 A1 | 11/2005 | Vinther | |
| 2006/0027795 A1* | 2/2006 | Crawford | |

* cited by examiner

*Primary Examiner*—Angel R. Estrada
(74) *Attorney, Agent, or Firm*—The Livingston Firm; Edward M. Livingston; Angela M. Miller

(57) ABSTRACT

A puller/connector (9) for electrical raceways (1) having a spiral shape that is predeterminedly sized so as to lock onto the troughs (3) located on the external surface of an electrical raceway (24) or into the crests (2) located on the internal surface of an electrical raceway (25). Located on a first end of the puller/connector (28) is preferably a barb (10) that is utilized for locking the puller/connector (9) onto/into the electrical raceway (1). Additional embodiments of the puller/connector (9) include a knockout sizing converter (12) and a hooked end for grounding purposes, a puller/connector (9) having a threaded attachment (16) and a puller/connector (9) having a cover (18).

14 Claims, 3 Drawing Sheets

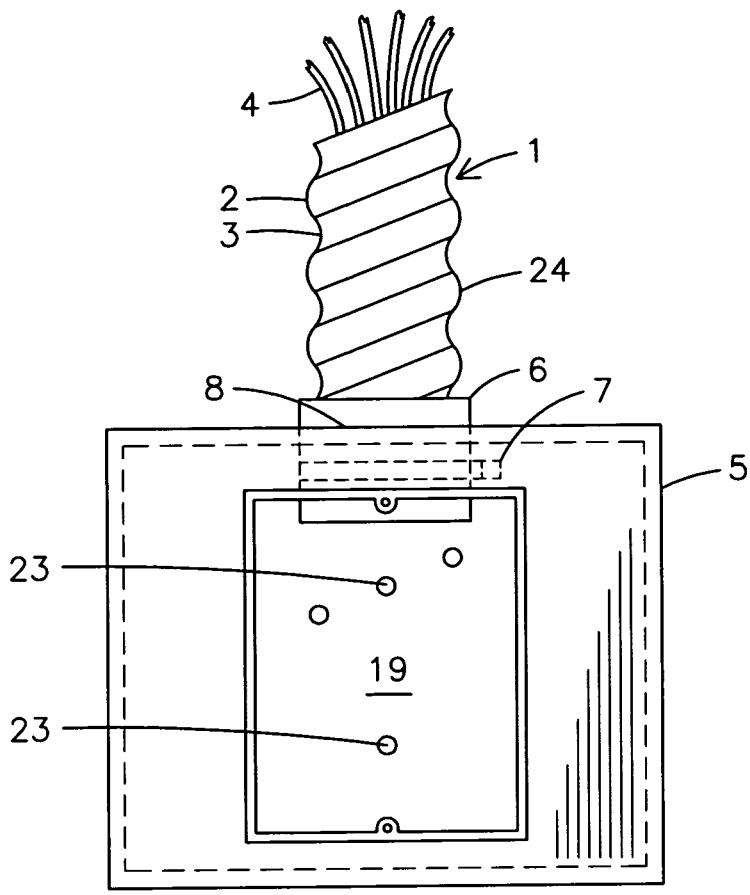
*FIG. 1*
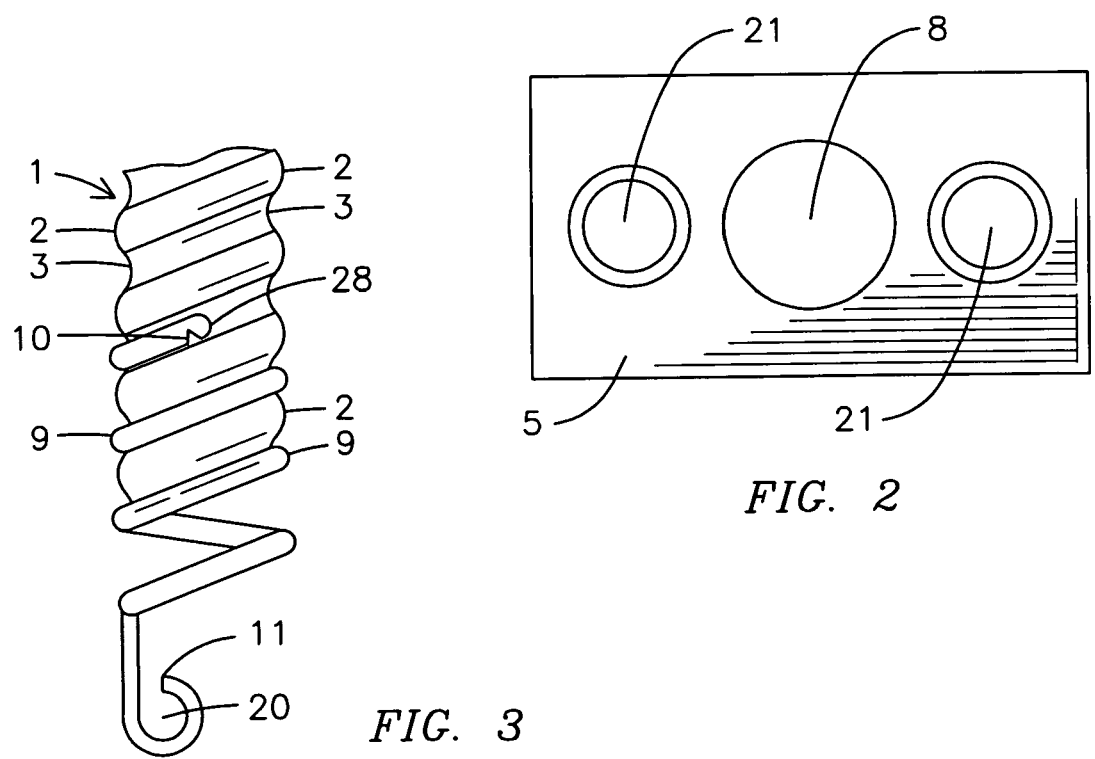
*FIG. 2*
*FIG. 3*

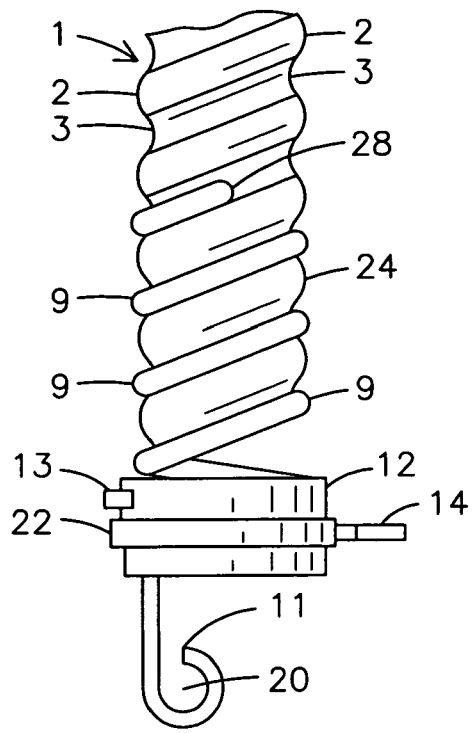
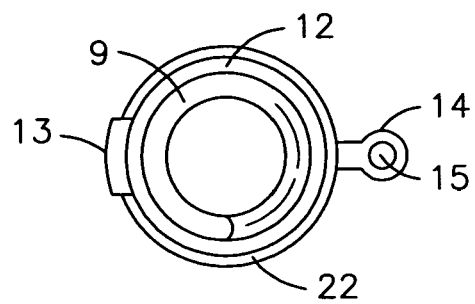
FIG. 4
FIG. 5
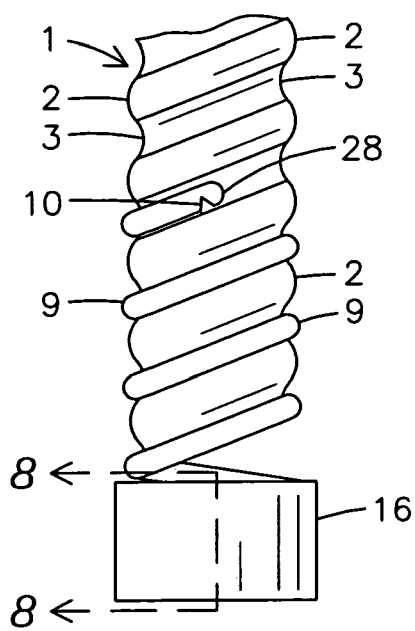
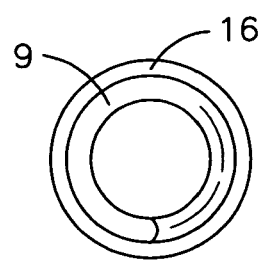
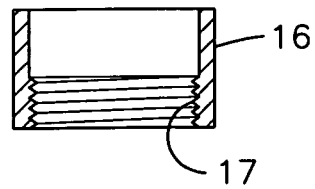
FIG. 6
FIG. 7
FIG. 8

PULLER/CONNECTOR FOR ELECTRICAL RACEWAYS

BACKGROUND OF THE INVENTION

This invention relates to electrical raceways, more particularly, a puller/connector for electrical raceways having a spiral shape so as to provide symmetrical force on the electrical raceway when pulled and to provide a secure connection once the electrical raceway is housed within an electrical box.

Electrical raceways, also known as "Greenfields", are hollow, flexible steel conduits having a plurality of crests and troughs that are used for housing electrical wires within a wall of a building. The electrical raceways have predetermined inner and outer diameters so as to house various amounts of electrical wires therein. When utilizing electrical raceways for wiring a building, the raceways are first fed through a wall of the building and directed towards an electrical box. Then, steel tape, which is a long piece of wire usually 100-200 feet in length having a hooked end, is used to pull the wires through the electrical raceway towards the electrical box.

To connect the electrical raceway to the electrical box, a "knockout", or removable piece of the electrical box or panel that is removed to allow the electrical raceway and ires to be inserted into the electrical box through the knockout. Once inserted, a straight electrical raceway connector and lock nut are used to secure the electrical raceway within the electrical box. Once secured, the electrical raceway may also serve as a ground. Although the use of electrical raceways has many advantages, there are some drawbacks to utilizing them, specifically during the installation process.

First, although the use of steel tape allows for pulling the electrical raceway through the wall interior towards the electrical box, because the steel tape pulls on one side of the electrical raceway, kinking occurs along the electrical raceway due to the asymmetrical force exerted on one end of the electrical raceway.

Second, because the edges of the electrical raceway are usually sharp, electrical raceways typically catch on the insulation located within the wall, thereby ripping the insulation and compromising the integrity of the insulation.

Finally, although the straight electrical raceway connector and lock nut are used to secure the electrical raceway within the electrical box, because the electrical box is typically narrow in diameter, it is difficult to obtain a tight lock around the electrical raceway. If the connector and lock nut are not tightly secured around the electrical raceway, the electrical raceway slips out of the connector and lock nut over time. As the electrical raceway may also serve as a ground, a loose connection or a disconnection lessens or eliminates the ground, thereby causing dangerous conditions.

Thus, a need exists for a puller/connector for electrical raceways that is able to safely pull electrical raceways through insulation without damaging the insulation and to permanently secure the electrical raceway within the electrical box when installed.

The relevant prior art includes the following references:

| Pat. No. (U.S. unless stated otherwise) | Inventor | Issue/ Publication Date |
| --- | --- | --- |
| 6,863,576 | Campbell et al. | Mar. 8, 2005 |
| 4,978,312 | Fodali | Dec. 18, 1990 |
| 3,058,083 | Schneider | Oct. 9, 1962 |
| 2005/0250354 | Vinther | Nov. 10, 2005 |
| 5,769,665 | Neely et al. | Jun. 23, 1998 |
| 916,436 | Greenfield | Mar. 30, 1909 |
| 1,847,924 | Calderwood | Mar. 1, 1932 |
| 4,806,108 | Meinhardt | Feb. 21, 1989 |

SUMMARY OF THE INVENTION

The primary object of the present invention is to provide a puller/connector for electrical raceways that provides symmetrical force on the electrical raceway when the electrical raceway is pulled.

Another object of the present invention is to provide a puller/connector for electrical raceways that provides a secure connection once housed within an electrical box.

A further object of the present invention is to provide a puller/connector for electrical raceways that grounds the electrical raceway within an electrical box.

An even further object of the present invention is to provide a puller/connector for electrical raceways that is easy to use.

Another object of the present invention is to provide a puller/connector for electrical raceways that is streamlined so as to not catch on insulation within the wall.

The present invention fulfills the above and other objects by providing a puller/connector for electrical raceways having a spiral shape that is predeterminedly sized so as to lock around the exterior diameter of an electrical raceway or, in the alternative, to lock into the crests of an interior diameter of the electrical raceway. Located on one end of the puller/connector is preferably a barb that is utilized for locking the puller/connector onto/into the electrical raceway.

Additional embodiments of the present invention include a puller/connector having a knockout-sizing converter and a hooked end for grounding purposes, a puller/connector having a threaded attachment and a puller/connector having a cover.

To use the present invention, a person simply rotatably attaches the spiral-shaped puller/connector either onto or into an electrical raceway. If the puller/connector is secured onto the electrical raceway, then the user locks the puller/connector onto/into the electrical raceway by squeezing the barb. Then, the user utilizes steel tape to hook onto a coil of the puller/connector to pull the puller/connector, and thus electrical raceway, through the insulation to the electrical box. Depending on the additional embodiments used, the user may then use the knockout-sizing converter to insert the electrical raceway into the preferred knockout hole, connect the electrical raceway to a pipe or cover the puller/connector to electrical raceway connection.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 1 is a plan view of an electrical raceway and straight Greenfield connector of the prior art installed in an electrical box;

FIG. 2 is a top view of an electrical box with one knockout removed;

FIG. 3 is a side view of a first embodiment of a connector/puller of the present invention connected to an electrical raceway;

FIG. 4 is a side view of a second embodiment of the connector/puller of the present invention connected to an electrical raceway;

FIG. 5 is a downward looking view of a converter of the second embodiment of the present invention;

FIG. 6 is a side view of a third embodiment of the connector/puller of the present invention connected to an electrical raceway;

FIG. 7 is a downward looking view of an attachment of the third embodiment of the present invention;

FIG. 8 is a cross-sectional view along line 8-8 of the embodiment of FIG. 7;

DESCRIPTION OF THE PREFERRED EMBODIMENTS

Figure 9:
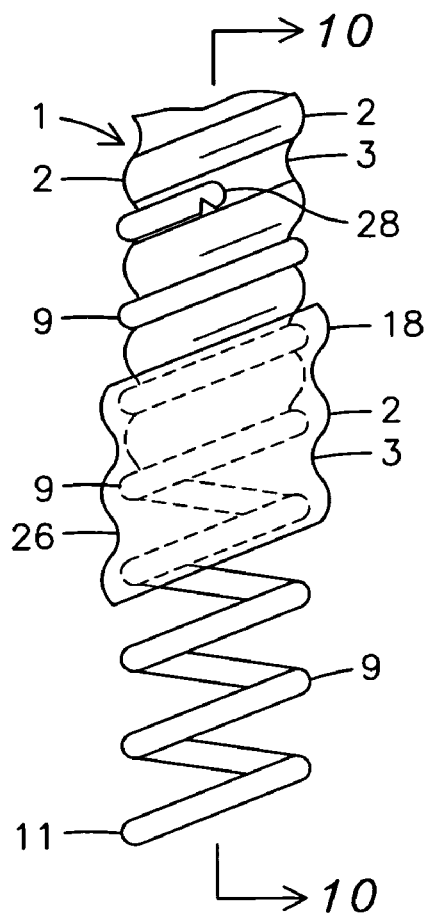
FIG. 9 is a side plan view of a fourth embodiment of the connector/puller of the present invention connected to an electrical raceway.

For purposes of describing the preferred embodiment, the terminology used in reference to the numbered components in the drawings is as follows:

| | |
|---|---|
| 1. | electrical raceway |
| 2. | crest |
| 3. | trough |
| 4. | electrical wires |
| 5. | electrical box |
| 6. | straight electrical raceway connector |
| 7. | lock nut |
| 8. | removed knockout |
| 9. | puller/connector |
| 10. | barb |
| 11. | puller/connector first end |
| 12. | converter |
| 13. | lip |
| 14. | converter arm |
| 15. | aperture |
| 16. | attachment |
| 17. | threads |
| 18. | cover |
| 19. | opening of electrical box |
| 20. | loop opening |
| 21. | intact knockout |
| 22. | rim |
| 23. | holes for grounding means |
| 24. | external surface of electrical raceway |
| 25. | internal surface of electrical raceway |
| 26. | external surface of cover |
| 27. | internal surface of cover |
| 28. | puller/connector second end |

With reference to FIG. 1, a plan view of an electrical raceway and straight Greenfield connector of the prior art installed in an electrical box is shown. The electrical raceway 1, which is also known as a Greenfield, is a hollow, flexible steel conduit having an external surface 24 with a plurality of crests 2 and troughs 3 that are used for housing electrical wires 4 within a wall of a building. The electrical raceways 1 are directed towards an electrical box 5 for insertion therein via a removed knockout 8. A lock nut 7 is used to hold the straight electrical raceway connector 6, and thus electrical raceway 1, within the electrical box 5. However, because the straight electrical raceway connector 6 only touches the crests 2 of the electrical raceway 1, the straight electrical raceway connector 6 is not able to firmly hold the electrical raceway 1 in place, regardless of how tight the lock nut 7 is secured around the straight electrical raceway connector 6. In addition, because the opening of the electrical box 19 is small in size and a person must reach into and upwards to reach the lock nut 7 in the electrical box 5, it is difficult for a person to thoroughly tighten the lock nut 7. Finally, the electrical box 5 includes a plurality of holes for grounding means 23 so as to permit a person to ground the electrical raceway 1, and thus electrical wires 4, therein.

In FIG. 2, a top view of an electrical box is shown. The electrical box 5 includes a plurality of intact knockouts 21 of variously-sized diameters for the acceptance of variously-sized electrical raceways 1. To insert an electrical raceway 1 within an electrical box 5, a person need only punch out the desired intact knockout 21 to create a removed knockout 8.

In FIG. 3, a side view of a first embodiment of a connector/puller of the present invention connected to an electrical raceway is shown. The connector/puller 9 of the present invention is spiral-shaped so as to rotatably attach to the electrical raceway 1 and be positioned in the troughs 3 of the electrical raceway 1. The connector/puller 9 has a puller/connector first end 11 and a puller/connector second end 28. The puller/connector first end 11 is looped so as to permit a screw or other fastening means to be inserted through the loop opening 20 for grounding purposes within an electrical box 5. In addition, the loop opening 20 provides an area for a person to use a steel tape to pull the puller/connector 9 towards an electrical box 5. Although the preferred embodiment of the puller/connector 9 includes the first end 11 being looped, the puller/connector first end 11 may be of any shape. The puller/connector 9 preferably includes a barb 10 located on the second end 28 that assists in locking the puller/connector 9 onto the electrical raceway 1. Although the connector/puller 9 provides a secure attachment to the electrical raceway 1, the barb 10 may be squeezed to provide an even tighter attachment on the electrical raceway 1.

FIG. 4 shows a side view of a second embodiment of the connector/puller of the present invention connected to an electrical raceway. Similar to the first embodiment, the second embodiment of the connector/puller 9 of the present invention is spiral-shaped and has a puller/connector first end 11. However, the second embodiment of the puller/connector 9 of the present invention does not include a barb. However, the puller/connector 9 includes a converter 12 having a lip 13, a rim 22 and a converter arm 14 that permits the puller/connector 9 and electrical raceway 1 to be installed in removed knockouts 8 of the electrical box 5. Because the converter 12 adds a predetermined width to the puller/connector 9, and thus electrical raceway 1, the electrical raceway 1 may be connected to the electrical box 5 wherein the rim 22 is located either within the electrical box 5 or outside the electrical box 5.

FIG. 5 is a downward looking view of a converter of the second embodiment of the present invention. The converter arm 14 of the converter 12 includes an aperture 15 for the insertion of a grounding means, which is preferably a screw.

With reference to FIG. 6, a side view of a third embodiment of the connector/puller of the present invention connected to an electrical raceway is shown. The puller/connector 9 of the third embodiment includes an attachment 16 that is preferably internally threaded. The use of the attachment 16 permits a person to connect the puller/connector 9 to another threaded object, such as a pipe or to the electrical box 5.

Next, FIG. 7 shows a downward looking view of an attachment of the third embodiment of the present invention. The attachment 16 is hollow so as to permit electrical wires 4 to run therethrough.

FIG. 8 shows a cross-sectional view along line 8-8 of the embodiment of FIG. 7. The attachment 16 preferably includes internal threads 17. However, the threads 17 may also be externally located on the attachment 16.

With reference to FIG. 9, a side plan view of a fourth embodiment of the connector/puller of the present invention connected to an electrical raceway is shown. A cover 18 is used in conjunction with the puller/connector 9 so as to shield the puller/connector 9 to electrical raceway 1 connection. The predeterminedly-sized cover 18 includes at least one crest 2 and at least one trough 3 located on the external surface of the cover 26.

Figure 10:
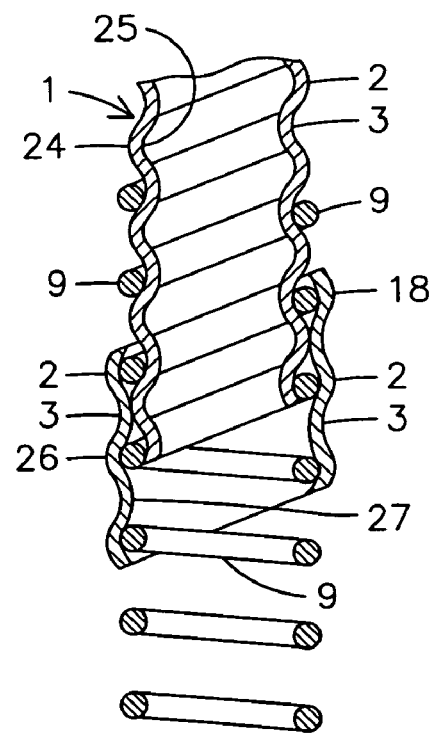
FIG. 10 is a cross-sectional view along line 10-10 of the embodiment of FIG. 9.

Finally, FIG. 10 shows a cross-sectional view along line 10-10 of the embodiment of FIG. 9. Similar to the external surface of the electrical raceway 24, the internal surface of the electrical raceway 25 includes a plurality of crests 2 and troughs 3. In addition, the internal surface of the cover 27 also includes a plurality of crests 2 and troughs 3. Thus, when using the cover 18 in conjunction with the puller/connector 9, the cover 18 is first rotatably attached onto the puller/connector 9 such that the puller/connector 9 is located within the crests 2 on the internal surface of the cover 27. Then, the puller/connector 9 is rotatably attached to the external surface of the electrical raceway 24 so as to have the puller/connector 9 located on the troughs 3 of the external surface of the electrical raceway 24. Thus, the cover 18 is a shield that protects a location where the puller/connector 9 and the electrical raceway 1 connect.

In a similar fashion, the puller/connector 9 may be secured within the crests 2 located on the internal surface of an electrical raceway 25, as opposed to the troughs 3 on the external surface of an electrical raceway 24 as shown in the above drawings.

In addition, as electrical raceways 1 are manufactured so as to include a plurality of diameters, such as ½ inch, ¾ inch and 1 inch, the puller/connector 9 of the present invention is preferably predeterminedly-sized so as to fit around or within the electrical raceway 1 of any given electrical raceway 1 diameter.

Furthermore, because a steel tape hooks onto the puller/connector 9, rather than directly onto the electrical raceway 1, when the electrical raceway 1 is pulled toward the electrical box 5, the pulling force is distributed on the puller/connector 9, thereby preventing kinking of the electrical raceway 1.

The use of the present invention will provide symmetrical force on the electrical raceway when the electrical raceway is pulled, provide a secure connection of the electrical raceway once housed within an electrical box and provide a grounding means.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

I claim:

1. A puller/connector for use with an electrical raceway having an internal surface, an external surface and a plurality of crests and troughs located on said internal and external surfaces, said puller/connector comprising:
   a spiral-shaped puller/connector having a first end and a second end;
   wherein said spiral-shaped puller/connector is predeterminedly-sized so as to rotatably attach to the electrical raceway;
   a converter secured between said first end and said second end;
   said converter having a rim;
   said converter having at least one lip;
   said converter having at least one converter arm; and
   wherein said at least one converter arm includes at least one aperture.

2. The puller/connector of claim 1 wherein:
   said first end is looped.

3. The puller/connector of claim 1 further comprising:
   at least one barb located on said second end.

4. The puller/connector of claim 1 further comprising:
   an attachment secured between said first end and said second end.

5. The puller/connector of claim 4 wherein:
   said attachment is internally threaded.

6. The puller/connector of claim 1 further comprising:
   at least one predeterminedly-sized cover having an internal surface and an external surface;
   said predeterminedly-sized cover having a plurality of crests and troughs located on said internal and external surfaces;
   wherein said predeterminedly-sized cover rotatably attaches to said puller/connector.

7. A puller/connector for use with an electrical raceway having an internal surface, an external surface and a plurality of crests and troughs located on said internal and external surfaces, said puller/connector comprising:
   a spiral-shaped puller/connector having a first end and a second end;
   wherein said spiral-shaped puller/connector is predeterminedly-sized so as to rotatably attach to the electrical raceway; and
   wherein said spiral-shaped puller/connector is rotatably attached to the external surface of the electrical raceway.

8. The puller/connector of claim 7 wherein:
   said first end is looped.

9. The puller/connector of claim 7 further comprising:
   at least one barb located on said second end.

10. The puller/connector of claim 7 further comprising:
    a converter secured between said first end and said second end; and
    said converter having a rim.

11. The puller/connector of claim 10 wherein:
    said converter has at least one lip;
    said converter has at least one converter arm; and
    wherein said at least one converter arm includes at least one aperture.

12. The puller/connector of claim 7 further comprising:
    an internally-threaded attachment secured between said first end and said second end.

13. The puller/connector of claim 7 further comprising:
    at least one predeterminedly-sized cover having an internal surface and an external surface;

said predeterminedly-sized cover having a plurality of crests and troughs located on said internal and external surfaces;

wherein said predeterminedly-sized cover screws onto said puller/connector.

14. A method for using a puller/connector for use with an electrical raceway having an internal surface, an external surface and a plurality of crests and troughs located on said internal and external surfaces, said puller/connector comprising a spiral-shaped puller/connector having a first end and a second end; wherein said spiral-shaped puller/connector is predeterminedly-sized so as to rotatably attach to the electrical raceway; and wherein said spiral-shaped puller/connector is rotatably attached to the external surface of the electrical raceway, said method comprising the steps of:

a. rotatably attaching said puller/connector to the external surface of said electrical raceway;

b. pulling said puller/connector toward an electrical box; and c. securing said puller/connector in said electrical box.

* * * * *